US011109300B2

(12) United States Patent
Jia et al.

(10) Patent No.: US 11,109,300 B2
(45) Date of Patent: Aug. 31, 2021

(54) ACCESS CONTROL METHOD AND APPARATUS AND COMMUNICATION SYSTEM

(71) Applicant: FUJITSU LIMITED, Kawasaki (JP)

(72) Inventors: Meiyi Jia, Beijing (CN); Lei Zhang, Beijing (CN); Xin Wang, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/829,119

(22) Filed: Mar. 25, 2020

(65) Prior Publication Data
US 2020/0288375 A1 Sep. 10, 2020

Related U.S. Application Data

(63) Continuation of application No. PCT/CN2017/111331, filed on Nov. 16, 2017.

(51) Int. Cl.
*H04W 48/02* (2009.01)
*H04W 76/10* (2018.01)

(52) U.S. Cl.
CPC .......... *H04W 48/02* (2013.01); *H04W 76/10* (2018.02)

(58) Field of Classification Search
CPC .............................. H94W 48/02; H04W 76/10
USPC ................................ 455/434, 410, 411, 418
See application file for complete search history.

(56) References Cited

U.S. PATENT DOCUMENTS

| 2012/0051342 | A1* | 3/2012 | Liu | H04W 74/08 370/338 |
| 2012/0106329 | A1 | 5/2012 | Ahmed et al. | |
| 2013/0182668 | A1* | 7/2013 | Xu | H04W 74/0833 370/329 |
| 2019/0174392 | A1* | 6/2019 | Chun | H04W 48/14 |

FOREIGN PATENT DOCUMENTS

| CN | 103314564 A | 9/2013 |
| WO | 2018/127162 A1 | 7/2018 |

OTHER PUBLICATIONS

International Search Report issued by the State Intellectual Property Office of the P.R. China for corresponding International Patent Application No. PCT/CN2017/111331, dated Jun. 28, 2018, with an English translation.

(Continued)

*Primary Examiner* — Nghi H Ly
(74) *Attorney, Agent, or Firm* — Myers Wolin, LLC

(57) ABSTRACT

An access control method and apparatus and communication system. The access control method includes: based on a mapping relationship between access attempt and access category, determining an access category to which an access attempt corresponds; performing access barring check based on the access category, so as to determine whether an access attempt to which the access category corresponds is barred; and transmitting a connection setup request message or a connection recovery request message to a network device when the access attempt is considered as allowed. Hence, an access category may be determined even in different scenarios, thereby achieving a unified access control mechanism in a simple and high-efficiency manner.

17 Claims, 5 Drawing Sheets

(56) References Cited

OTHER PUBLICATIONS

Written Opinion of the International Searching Authority issued by the State Intellectual Property Office of the P.R. China for corresponding International Patent Application No. PCT/CN2017/111331, dated Jun. 28, 2018, with an English translation.
Ericsson, "Establishment causes for NR", Agenda item: 10.4.1.8, 3GPP TSG-RAN WG2 Meeting #99bis, R2-1710480, Prague, Czech Republic, Oct. 9-13, 2017.
Nokia et al., "Access Control in NG-RAN", Agenda item: 10.4.1.6, 3GPP TSG-RAN WG2 Meeting #98, R2-1705324, R2-1703200, Hangzhou, China, May 15-19, 2017.
Ericsson, "Access Control for NR", Agenda item: 10.4.1.8, 3GPP TSG-RAN WG2 Meeting #99bis, R2-1710478, Revision of R2-1708528, Prague, Czech Republic, Oct. 9-13, 2017.
Ericsson et al., "5G—discussion on unified access control", Agenda item: 15.2.1.7, 3GPP TSG-CT WG1 Meeting #106, C1-173823, Kochi, India, Oct. 23-27, 2017.
Extended European search report with supplementary European search report and the European search opinion issued by the European Patent Office for corresponding European Patent Application No. 17932449.6, dated Oct. 19, 2020.
Notice of Reasons for Refusal issued by the Japan Patent Office for corresponding Japanese Patent Application No. 2020-516886, dated May 25, 2021, with an English translation.
Examination Report issued by the Patent Office of India for corresponding Indian Patent Application No. 202037010783, dated Jun. 30, 2021, with an English translation.

* cited by examiner

ACCESS CONTROL METHOD AND APPARATUS AND COMMUNICATION SYSTEM

CROSS REFERENCE TO RELATED APPLICATIONS

This application is a continuation application of International Application No. PCT/CN2017/111331, filed on Nov. 16, 2017, the contents of which are incorporated herein by reference.

TECHNICAL FIELD

This disclosure relates to the field of communication technologies, and in particular to an access control method and apparatus and a communication system.

BACKGROUND

In a long-term evolution (LTE) system, for example, the following access control technologies exist:

access category barring (ACB), which is an access barring mechanism based on a type of access attempt (such as terminal-initiated data or terminal-initiated signaling) and an access category (AC) to which a user equipment (UE) belongs;

access control barring-skip (ACB-skip), which allows a high priority of multi-media telephony (MMTEL) voices/videos and short message services (SMS);

service specific access control (SSAC), which is an access barring mechanism for sessions initiated by MINITEL voices/video;

extended access barring (EAB), such as a machine-type communication (MTC)-specific access barring mechanism;

AB for NB-IoT, which is an access barring mechanism specific for a narrow-band Internet of Things (NB-IoT); and Application-specific congestion control for data communication (ACDC), which is an application-specific access barring mechanism in a UE determined by an operator.

Furthermore, an access request rejection method may also be used for access control. For example, after performing a random access procedure, a user equipment may transmit a radio resource control (RRC) connection setup request or a connection recovery request, in which a setup cause value is carried, to a network side; based on the setup cause value, the network side may decide whether to accept the request; if the network side accepts the request, it may transmit an RRC connection setup message or an RRC connection recovery message, otherwise, it may reply with an RRC connection reject message. By accepting or rejecting the connection setup request or connection recovery request, the network side may control a situation of congestion.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in a fifth generation (5G) such as new radio (NR) system, there is a need to provide a unified access control (UAC) mechanism. However, for how to perform determination of an access category, there exists no solution currently.

Embodiments of this disclosure provide an access control method and apparatus and communication system, in which an access category to which an initiated access attempt (such as each new access attempt) corresponds is determined based on a mapping relationship between access attempt and access category.

According to a first aspect of the embodiments of this disclosure, there is provided an access control method, including:

based on a mapping relationship between access attempt and access category, determining an access category to which an access attempt corresponds;

performing access barring check based on the access category, to determine whether an access attempt to which the access category corresponds is barred; and transmitting a connection setup request message or a connection recovery request message to a network device when the access attempt is considered as allowed.

According to a second aspect of the embodiments of this disclosure, there is provided an access control apparatus, including:

an access category determining unit configured to, based on a mapping relationship between access attempt and access category, determine an access category to which an access attempt corresponds;

an access barring checking unit configured to perform access barring check based on the access category, to determine whether an access attempt to which the access category corresponds is barred; and a request transmitting unit configured to transmit a connection setup request message or a connection recovery request message to a network device when the access attempt is considered as allowed.

According to a third aspect of the embodiments of this disclosure, there is provided an access control method, including:

transmitting configuration information used for configuring a mapping relationship between access attempt and access category to a user equipment (UE), so that the UE determines an access category to which an access attempt corresponds based on the mapping relationship between access attempt and access category;

receiving a connection setup request message or a connection recovery request message transmitted by the UE; and determining whether the connection setup request message or the connection recovery request message of the UE is allowed.

According to a fourth aspect of the embodiments of this disclosure, there is provided an access control apparatus, including:

a configuration transmitting unit configured to transmit configuration information used for configuring a mapping relationship between access attempt and access category to a user equipment (UE), so that the UE determines an access category to which an access attempt corresponds based on the mapping relationship between access attempt and access category;

a request receiving unit configured to receive a connection setup request message or a connection recovery request message transmitted by the UE; and a connection determining unit configured to determine whether the connection setup request message or the connection recovery request message of the UE is allowed.

According to a fifth aspect of the embodiments of this disclosure, there is provided a communication system, including:

a network device, including the access control apparatus as described in the fourth aspect; and a user equipment (UE), including the access control apparatus as described in the second aspect.

An advantage of the embodiments of this disclosure exists in that an access category to which an initiated access attempt corresponds is determined based on a mapping relationship between access attempt and access category. Hence, an access category may be determined even in different scenarios, thereby achieving a unified access control mechanism in a simple and high-efficiency manner.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

Figure 1:
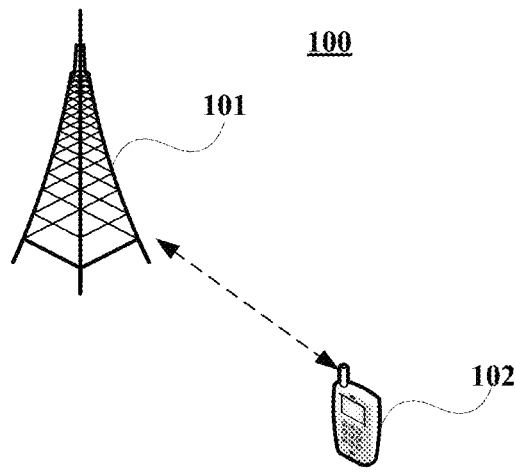
FIG. 1 is a schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "user equipment side" refers to a side of a user, which may be a UE, and may include one or more user equipments described above.

Scenarios in the embodiments of this disclosure shall be described below by way of examples; however, this disclosure is not limited thereto.

FIG. 1 is a schematic diagram of a communication system of an embodiment of this disclosure, in which a case where a user equipment and a network device are taken as examples is schematically shown. As shown in FIG. 1, a communication system 100 may include a network device 101 and a user equipment 102. For the sake of simplicity, description is given in FIG. 1 by taking one user equipment and one network device only as an example; however, the embodiments of this disclosure are not limited thereto.

In the embodiment of this disclosure, existing traffics or traffics that may be implemented in the future may be performed between the network device 101 and the user equipment 102. For example, such traffics may include but not limited to an enhanced mobile broadband (eMBB), massive machine type communication (MTC), and ultra-reliable and low-latency communication (URLLC).

A unified access control mechanism is provided in an NR system, which may include, for example, each access attempt being able to be categorified into an access category (AC); a network side being able to broadcast access control information; based on access control information of a corresponding access category applicable to an access attempt, the user equipment checking whether to perform actual access attempt.

For example, the access category may include the following features: supporting expandability, allowing addition of additional standardized access categories (such as AC 0 to AC 30) and an access category defined by an operator by using its own policies (such as applications, network slicing, etc.) (such as AC 31 to AC 63); access categories being as mutually exclusive as possible, such as defining an access category in a combined manner by using UE-related situations and an access attempt type; and user equipment being not necessarily to support simultaneous connection of NR and LTE in a LTE carrier band. For example, a unified access control mechanism may be applicable to a UE access to a 5G core network by using evolved universal mobile telecommunications system (UMTS) terrestrial radio access (E-UTRA) or NR. Furthermore, the mechanism may also be applicable to a situation where a user equipment in an idle state, an inactive state, or a connected state initiates a new access attempt (such as a new session request).

In the following, the embodiment of the present disclosure will be described by taking an NR system as an example. However, this disclosure is not limited thereto, and may also be applied to any system in which similar problems exist.

Embodiment 1

The embodiments of this disclosure provide an access control method, which shall be described from a UE side.

Figure 2:
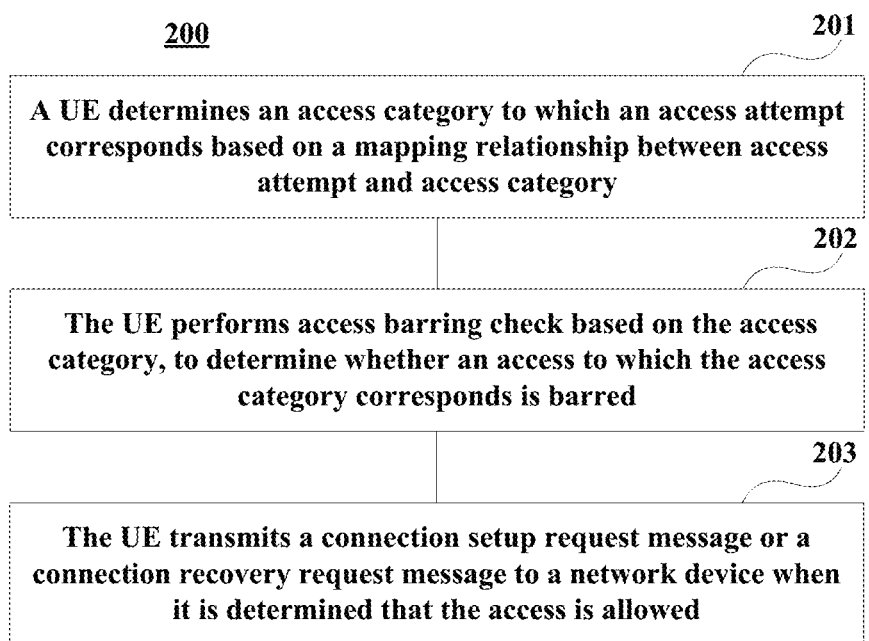
FIG. 2 is a schematic diagram of the access control method of an embodiment of this disclosure.

FIG. 2 is a schematic diagram of the access control method of the embodiment of this disclosure, in which a situation at the UE side is shown. As shown in FIG. 2, the access control method 200 includes:

step 201: the UE determines an access category to which an access attempt corresponds based on a mapping relationship between access attempt and access category;

step 202: the UE performs access barring check based on the access category, to determine whether an access attempt to which the access category corresponds is barred; and step 203: the UE transmits a connection setup request message or a connection recovery request message to a network device when the access attempt is considered as allowed.

In an embodiment, the user equipment may determine a corresponding access category for each new access attempt, or may determine a corresponding access category for an initiated access attempt. And the mapping relationship between access attempt and access category may be predetermined and stored in the user equipment, for example, it may be predefined by an operator or in a standard, or may be configured by a base station via a configuration message (such as an RRC message); however, this disclosure is not limited thereto.

Figure 3:
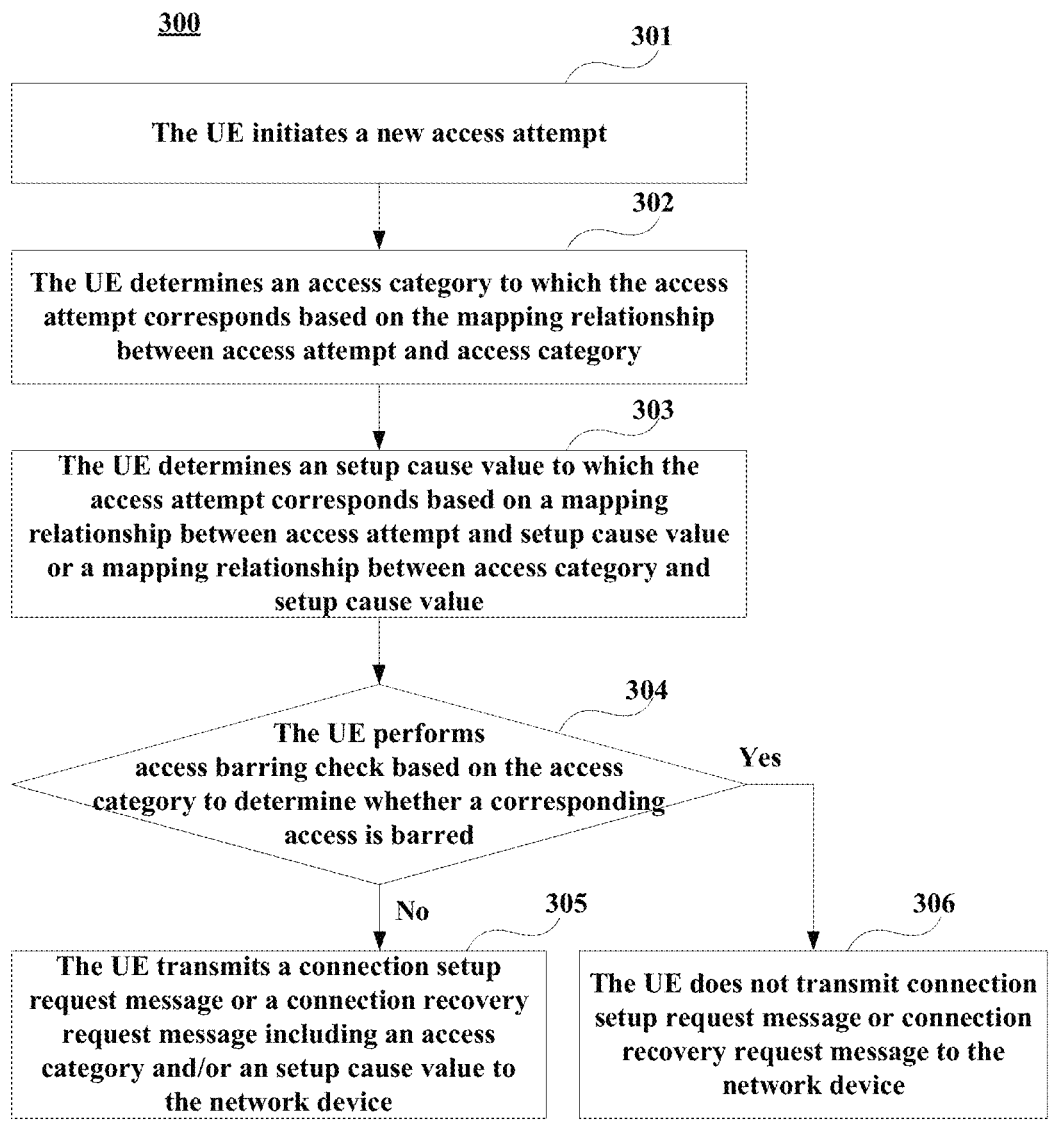
FIG. 3 is another schematic diagram of the access control method of the embodiment of this disclosure.

FIG. 3 is another schematic diagram of the access control method of the embodiment of this disclosure, which shall be described by taking a new access attempt as an example. As shown in FIG. 3, an access control method 300 includes:

step 301: the user equipment initiates a new access attempt;

step 302: the user equipment determines an access category to which the access attempt corresponds based on the mapping relationship between access attempt and access category;

step 303: the user equipment determines a setup cause value to which the access attempt corresponds based on a mapping relationship between access attempt and setup cause value or a mapping relationship between access category and setup cause value;

step 304: the user equipment performs access barring check based on the access category to determine whether an access to which the access category corresponds is barred, executing step 305 if it is determined that the access is not barred (that is, the access is allowed), otherwise, executing step 306;

step 305: the user equipment transmits a connection setup request message or a connection recovery request message including an access category and/or a setup cause value to the network device; and step 306: the user equipment does not transmit connection setup request message or connection recovery request message to the network device.

In an embodiment, the mapping relationship between access attempt and setup cause value or the mapping relationship between access category and setup cause value may be predetermined and stored in the user equipment, for example, it may be predefined by an operator or in a standard, or may be configured by the base station via a configuration message (such as an RRC message); however, this disclosure is not limited thereto.

In an embodiment, multiple access categories may be predefined, for example, they may include AC 0 to AC 30 defined in the standards and AC 31 to AC 63 defined by an operator. Multiple access categories may correspond to one setup cause value, for example, AC 0 to AC 3 correspond to a cause value 1, AC 4 to AC 10 correspond to a cause value 2 . . . . However, this disclosure is not limited thereto, and an access category and a setup cause value may be defined as actually demanded.

In an embodiment, the user equipment may include the access category in the connection setup request message or the connection recovery request message based on an indication of the network device or based on a condition configured by the network device, or include the setup cause value in the connection setup request message or the connection recovery request message.

For example, the network side may configure a parameter useAccessCate, and when the parameter is set to be True, the access category may be contained in the connection setup request message or connection recovery request message; thus, the base station may obtain more accurate information. And in a case where the parameter is not set to be True, for example, the parameter is set to be false, the setup cause value may be included in the connection setup request message or the connection recovery request message, thereby saving message resources.

Alternatively, the network side may configure a threshold TH, and when the number of required resources (such as the number of bits) indicating the access category is greater than the threshold, the setup cause value may be included in the connection setup request message or connection recovery request message; and when the number of the required resources (such as the number of bits) indicating the access category is less than or equal to the threshold, the access category may be included in the connection setup request message or the connection recovery request message.

It should be noted that FIGS. 2 and 3 only schematically illustrate the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIGS. 2 and 3.

In one embodiment, the access category and/or the setup cause value may be determined in a non-access stratum (NAS).

One or more of the mapping relationship between access attempt and access category, the mapping relationship between access attempt and setup cause value and the mapping relationship between access category and setup cause value may be defined in the NAS, or notified by the network device to the user equipment via signaling of the NAS, the NAS may indicate or deliver the determined access category and/or the setup cause value to a radio resource control (RRC) layer, and the RRC layer performs the access barring check.

For example, any entity or layer initiating an access attempt provides the NAS with information on access attempt, and the RRC layer may provide the NAS with parameters related to determining the access category in the access control information received from the network side, such as a UE category applicable to AC2.

For another example, the mapping relationship between access attempt and access category may be defined in an NAS protocol, and/or the mapping relationship between access attempt and setup cause value or the mapping relationship between access category and setup cause value may be defined in the NAS protocol.

For a further example, when the RRC layer performs the access barring check, the NAS may inform the RRC layer of the determined access category and/or setup cause value. In this way, the RRC layer may perform access barring check based on the access category received from the NAS and the access control information received from the network side to determine whether an access to which the access category corresponds is barred; and if it is determined that the access is not barred (that is, the access is allowed), the UE may include the access category or setup cause value received from the NAS in the request message, so that the network side determines whether to accept the connection setup request or connection recovery request based on the access category or setup cause value.

In another embodiment, the access category and/or the setup cause value may be determined in the RRC layer. One or more of the mapping relationship between access attempt and access category, the mapping relationship between access attempt and setup cause value and the mapping relationship between access category and setup cause value may be defined in the RRC layer, or notified by the network device to UE via signaling of the RRC layer; and the RRC layer performs the access barring check.

For example, any entity or layer initiating an access attempt may provide information on the access attempt to the RRC layer, and the NAS provides the RRC layer with parameters needed in determining an access category, such as public land mobile network (PLMN) information, a slice and/or a UE category in AC2.

For another example, the mapping relationship between access attempt and access category may be defined in the RRC layer protocol, and/or the mapping relationship between access attempt and setup cause value or the mapping relationship between access category and setup cause value may be defined in the RRC layer protocol.

For a further example, in a case where the RRC layer performs access barring check, the RRC layer maps the access attempt into a corresponding access category based on information received from any entity or layer that may possibly initiate an access attempt, information received from the NAS and information received from the network side, and determines the setup cause value based on the access attempt/access category; the RRC layer may perform an access barring check based on the access control information received from the network side to determine whether the access to which the access category corresponds is barred; and if it is determined that the access is not barred (that is, the access is allowed), the UE may include the access category or the setup cause value in the request message so that the network side determines whether to accept the connection setup request or connection recovery request base on the access category or setup cause value.

With the above NAS centralized mapping method or RRC layer centralized mapping method, a unique access category may be easily determined, and a unified access control mechanism may further be efficiently achieved.

In a further embodiment, the access category and/or the setup cause value may be determined in multiple layers. One or more of the mapping relationship between access attempt and access category, the mapping relationship between access attempt and setup cause value and the mapping relationship between access category and setup cause value may be defined in the layer initiating the access attempt or a layer determined according to an RRC state.

For example, the access category is determined in the layer initiating the access attempt or the layer determined according to an RRC state, and/or the setup cause value is determined in a layer that determines the access category or the layer determined according to an RRC status.

For another example, the layer initiating the access attempt may include, for example, one or more of the following layers, and/or one or more entities: an application layer, an Internet Protocol (IP) layer, an NAS, and an RRC layer or a user plane; and the layer determined according to the RRC state may include, for example, one or more of the following layers, and/or, one or more entities: an NAS when the user equipment is in an idle state, an RRC layer when the user equipment is in a deactivated state, a user plane when the user equipment is in a connected state. However, this disclosure is not limited thereto, and a particular implementation may be determined as actually demanded.

In an implementation, in a case where multiple different access categories are determined in the multiple different layers, the NAS or the RRC layer may select an access category from the multiple different access categories, thereby determining a unique access category for subsequent access barring check.

For example, it may be achieved in the NAS layer; and a ranking of ACs may be specified in advance, such as selecting an AC of a highest or lowest category.

For another example, it may be achieved in the RRC layer; and principles of determining a unique access category may be specified in the RRC protocol, or the principles may be configured by the network side. The principles may be common to all user equipments, or may be specific to some user equipments.

These principles may include: an AC ranking and how to select, such as selecting an access category of a highest or lowest category; and a principle of priority, that is, selecting a type of ACs at different times or in different RRC states. For example, when a standardized access category and an operator-defined access category are determined at the same time, the operator-defined access category is used. However, this disclosure is not limited thereto, for example, it may also be a combination of the above principles, and a particular implementation may be determined as actually demanded.

With the above distributed mapping method, inter-layer interaction may be reduced as possible, a unique access category may be determined from multiple access categories, and a unified access control mechanism may further be simply achieved.

In yet another embodiment, the user equipment may process one or more timers used for access control; and each timer corresponds to an access category or an access category group or all access categories. The timers may be configured by an RRC layer or an NAS, and/or, the timers may be maintained by the RRC layer or the NAS; however, this disclosure is not limited thereto.

Following description shall be given by taking the following four types of timers as an example. However, this disclosure is not limited thereto; for example, only one or more timers therein may be defined, and other timers may also be defined.

For example, the timers may include a UE-specific barred timer $T_{ue\_barred}$. The network side may configuration information to configure the timer and an AC applicable to the timer for the UE. When an access category is applicable to (such as defining or configuring) the $T_{ue\_barred}$ and a result of the access barring check according to the access category is that an access to which the access category corresponds is barred, the $T_{ue\_barred}$ is started; and in a case where the $T_{ue\_barred}$ is running, no access barring check is performed on all or specified or configured access categories of the UE, and an access attempt or an access to which the access category corresponds is determined (or deemed) as being barred.

For example, the UE determines that access categories of an access attempt are AC 8 and AC 48, and the access control information configured by the network side is configured with the $T_{ue\_barred}$, and indicates that the timer is applicable to all access categories. In this way, the UE may perform access barring check based on UE implementation or indication of the network side and according to AC 8 or AC 48. If a result is access barring, it will not perform access barring check based on AC 48 or AC 8, and start the $T_{ue\_barred}$; and if the result is access allowance, the UE needs to perform access barring check based on AC 48 or AC 8.

Thus, by using the timer $T_{ue\_barred}$, it is possible to control how a UE for which multiple access categories have been determined performs access barring check. This timer may be applied to a situation where a network congestion is very serious, in which case with a smaller number of pieces of access barring check, more UEs may be barred from accessing, so that the network congestion situation may be quickly alleviated.

For another example, the timer may include a UE-specific allow timer $T_{ue\_allowed}$. The network side may transmit configuration information to configure the timer and an AC applicable to the timer for the UE. When an access category is applicable to (such as defining or configuring) the $T_{ue\_allowed}$ and a result of the access barring check performed according to the access category is that an access to which the access category corresponds is allowed, the $T_{ue\_allowed}$ is started; and in a case where the $T_{ue\_allowed}$ is running, the access barring check is not performed on all or specified or configured access categories of the UE, and an access attempt or an access to which the access category corresponds is determined (or deemed) as being allowed.

For example, the UE determines that access categories of an access attempt are AC 8 and AC 48, and the access control information configured by the network side is configured with the $T_{ue\_allowed}$, and indicates that the timer is applicable to all access categories. In this way, the UE may perform access barring check based on UE implementation or indication of the network side and according to AC 8 or AC 48. If a result is access allowance, it will not perform access barring check based on AC 48 or AC 8, and start the $T_{ue\_allowed}$; and if the result is access barring, the UE needs to perform access barring check based on AC 48 or AC 8.

Thus, by using the timer $T_{ue\_allowed}$, it is possible to control how a UE for which multiple access categories have been determined performs access barring check. This timer may be applied to a situation where a network congestion is relatively slight, in which case with a smaller number of pieces of access barring check, more UEs may be allowed for accessing.

For a further example, the timer may include an access-category (group)-specific barring timer $T_{ac\_barred}$. The network side may transmit configuration information to configure the timer for an access category or an access category group. When an access category is applicable to (such as defining or configuring) the $T_{ac\_barred}$ and a result of the access barring check performed according to the access category is that an access to which the access category corresponds is barred, the $T_{ac\_barred}$ is started; and in a case where the $T_{ac\_barred}$ is running, the access barring check is not performed on the access category or the access category group, and an access attempt or an access to which the access category or the access category group corresponds is determined (or deemed) as being barred.

For example, the UE determines that access categories of an access attempt are AC 8 and AC 48, and the access control information configured by the network side is configured with the $T_{ac\_barred}$, and indicates that the timer is applicable to AC 8. In this way, the UE may perform access barring check based on UE implementation or indication of the network side and according to AC 8 or AC 48. If the UE determines to perform access barring check first based on AC 48 and a result of the check is access barring, it will not perform access barring check based on AC 48, and start the $T_{ac\_barred}$; and if the result is access allowance, the UE needs to perform access barring check based on AC 48.

Thus, by using the timer $T_{ac\_barred}$, it is possible to control how a UE for which multiple access categories have been determined performs access barring check. This timer may be applied to a situation where a network congestion is moderate and some UEs or services are of lower priorities or relatively large numbers, in which case with a smaller number of pieces of access barring check, more UEs of corresponding categories may be barred from accessing.

For a further example, the timer may include an access-category (group)-specific barring timer $T_{ac\_allowed}$. The network side may transmit configuration information to configure the timer for an access category or an access category group. When an access category is applicable to (such as defining or configuring) the $T_{ac\_allowed}$ and a result of the access barring check performed according to the access category is that an access to which the access category corresponds is allowed, the $T_{ac\_allowed}$ is started; and in a case where the $T_{ac\_allowed}$ is running, the access barring check is not performed on the access category or the access category group, and an access attempt or an access to which the access category or the access category group corresponds is determined (or deemed) as being allowed.

For example, the UE determines that access categories of an access attempt are AC 8 and AC 48, and the access control information configured by the network side is configured with the $T_{ac\_allowed}$, and indicates that the timer is applicable to AC 8. In this way, the UE may perform access barring check based on UE implementation or indication of the network side and according to AC 8 or AC 48. If the UE determines to perform access barring check first based on AC 8 and a result of the check is access allowance, it will not perform access barring check based on AC 48, and start the $T_{ac\_allowed}$; and if the result is access barring, the UE needs to perform access barring check based on AC 48.

Thus, by using the timer $T_{ac\_allowed}$, it is possible to control how a UE for which multiple access categories have been determined performs access barring check. This timer may be applied to a situation where a network congestion is moderate and some UEs or services are of higher priorities or relatively small numbers, in which case with a smaller number of pieces of access barring check, more UEs of corresponding categories may be allowed for accessing.

It should be noted that in addition to that the above timers may be used individually, they may also be used in combination with each other to deal with situations where more complex network payloads, which shall be schematically described below by way of two examples.

In one example, such as in a case of severe network congestion, the access control information notified by the network side includes the UE-specific barring timer $T_{ue\_barred}$ applicable to all ACs, and the allow timer $T_{ac\_allowed}$ corresponding to AC 3 and AC 32.

For example, UE 1 determines that access categories are AC 3 (i.e. the emergency call defined in standards) and AC 32 (an access category to which an emergency service corresponds defined by an operator); according to what is specified in a protocol/configured by the network, UE 1 first performs access barring check according to AC 3. If a result of the check is access barring, UE 1 does not need to perform access barring check for AC 32, directly deems that the access is barred, and starts the UE-specific barring timer $T_{ue\_barred}$; and if the result of the check is access allowance, it directly deems that the access is allowed, and starts the AC-specific allow timer $T_{ac\_allowed}$. In consideration that the timer is applicable to AC 32, UE 1 does not need to perform access barring check for AC 32.

For another example, UE 2 determines that access categories are AC 3 (i.e. the emergency call defined in standards) and AC 42 (an access category to which an ordinary service corresponds defined by an operator); according to what is specified in a protocol/configured by the network, UE 2 first performs access barring check according to AC 3. If a result of the check is access barring, UE 2 does not need to perform access barring check for AC 42, directly deems that the access is barred, and starts the UE-specific barring timer $T_{ue\_barred}$; and if the result of the check is access allowance, it directly deems that the access is allowed, and starts the AC-specific allow timer $T_{ac\_allowed}$. In consideration that the timer is not applicable to AC 42, UE 2 still needs to perform access barring check for AC 42. And if the result of the check is access allowance, UE 2 initiates a connection setup procedure, otherwise, the access attempt is barred, and the UE-specific barring timer $T_{ue\_barred}$ is started.

In another example, the above timer mechanism may be used to process multiple access categories, and may also be used to simplify inter-layer interaction.

For example, in order to determine whether an access attempt belongs to AC 1, following steps are needed: (1) checking which one or more of AC 11 to AC 15 is/are access category(es) of the UE; (2) determining whether a selected PLMN type is a home PLMN or a visited PLMN, and determining whether there exists a valid UE category in the UE, by the NAS; (3) checking whether a flag of the valid UE category to which the UE corresponds in the barring control information configured by the network side is barred or not barred, and if it is not barred, the access attempt belongs to AC 1; otherwise, the access attempt does not belong to AC 1, and the UE further needs to determine another access category than AC 1 for the access attempt.

To simplify the above process, the above timers may be used to achieve the same effect.

For example, the network configures a UE-specific allow timer $T_{ue\_allowed}$, which is applicable to all ACs, for AC 1. Through the above steps (1) and (2), the UE determines that it owns a valid high UE category (such as one or some of AC 11 to AC 15), then it determines that an access category of the UE is AC 1; furthermore, it determines other one or more access categories for the UE, which may be, for example, any other access categories than AC 0, AC 1 and AC 2.

In this way, the UE first performs access barring check according to AC 1. If a result is access allowance, the UE directly deems that a connection setup procedure is allowed to be initiated; otherwise, a result of check is access barring, and further performs access barring check based on another determined access category.

It should be noted that the above description is given by taking AC 1 as an example. However, this disclosure is not limited thereto; for example, it is also applicable to a case where whether an access attempt belongs to AC2 is determined.

Thus, the network side may deal with different congestion situations via simple timer configurations; and via simple timer processing, the terminal side may reduce the number of times of access barring check as possible, and reduce energy consumption and lower latency of initiating connection setup.

Furthermore, the above timer configuration mechanism may be used individually or may be used in combination with the above centralized mapping mode or distributed mapping mode. In a case of multiple access categories, which access category is to be performed access barring check first may be determined by the UE implementation, or may be specified in a protocol in advance, or may be controlled by the network side. For example, the control of the network may be implicit, such as performing check first on an access category that is configured first according to an order of configurations of access categories in the access control information; and the control of the network may be explicit, such as explicitly configuring an execution order of access categories.

It should be noted that for a UE in a deactivated or connected state, whether there exists a timer is running needs to be checked first. A time for the check may be prior to determination of an access category, or may be after determination of an access category, or before each time of performing access barring check, or may be other times as needed. Contents that are not explicitly described in the embodiments of this disclosure, reference may be made to related techniques, which are not limited in this disclosure.

It can be seen from the above embodiments that in different scenarios (such as different RRC states, including an idle state, a non-activated state and a connected state), when the UE performs an access attempt, for example, an access category to which the access attempt corresponds may be uniquely determined; and in a case where an access category is unable to be uniquely determined, multiple access categories are processed, thereby performing access barring check based on the access category, and achieving a unified access control mechanism.

Embodiment 2

The embodiments of this disclosure provide an access control method, applicable to a network device side, with contents in the embodiments identical to those in Embodiment 1 being not going to be described herein any further.

Figure 4:
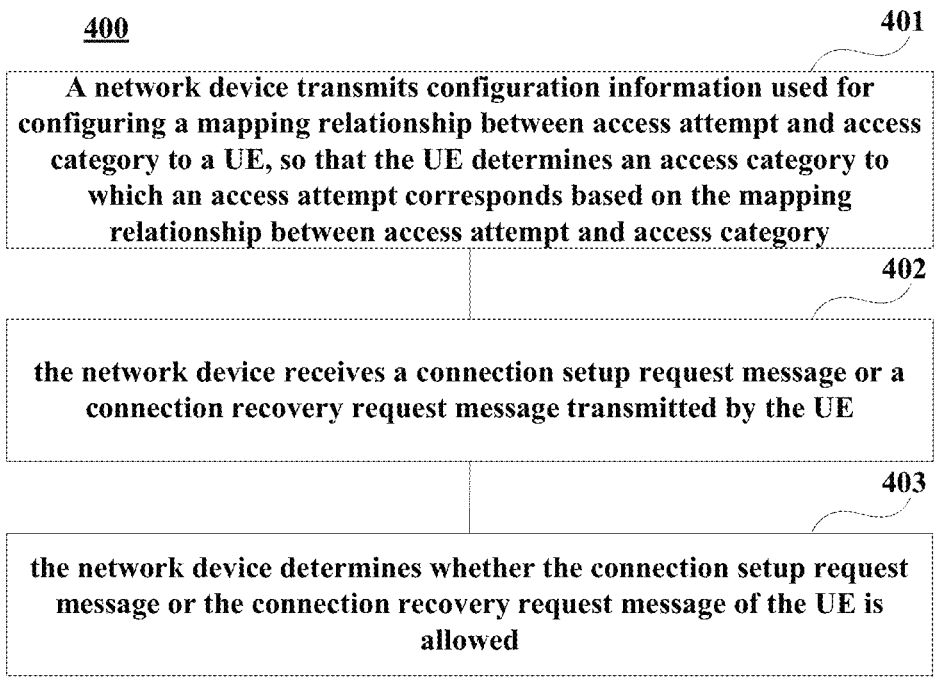
FIG. 4 is a further schematic diagram of the access control method of the embodiment of this disclosure.

FIG. 4 is a schematic diagram of the access control method of the embodiment of this disclosure, in which a situation at the network device side is shown. As shown in FIG. 4, an access control method 400 includes:

step 401: the network device transmits configuration information used for configuring a mapping relationship between access attempt and access category to a UE, so that the UE determines an access category to which an access attempt corresponds based on the mapping relationship between access attempt and access category;

step 402: the network device receives a connection setup request message or a connection recovery request message transmitted by the UE; and step 403: the network device determines whether the connection setup request message or the connection recovery request message of the UE is allowed.

In an embodiment, the network device may further transmit configuration information used for configuring a mapping relationship between access attempt and setup cause value or a mapping relationship between access category and setup cause value to the UE, so that the UE determines a setup cause value to which an access attempt corresponds based on the mapping relationship between access attempt and setup cause value or the mapping relationship between access category and setup cause value.

In an embodiment, the network device may further transmit configuration information used for configuring one or more timers used for access control to the UE; each timer corresponds to an access category or an access category group or all access categories.

It should be noted that FIG. 4 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 4.

It can be seen from the above embodiments that in different scenarios (such as different RRC states, including an idle state, a non-activated state and a connected state), when the UE performs an access attempt, for example, an access category to which the access attempt corresponds may be uniquely determined; and in a case where an access category is unable to be uniquely determined, multiple access categories are processed, thereby performing access barring check based on the access category, and achieving a unified access control mechanism.

Embodiment 3

The embodiments of this disclosure provide an access control apparatus. The apparatus may be a UE, and may also be one or more components or assemblies configured in a UE. And contents in the embodiments identical to those in Embodiment 1 shall not be described herein any further.

Figure 5:
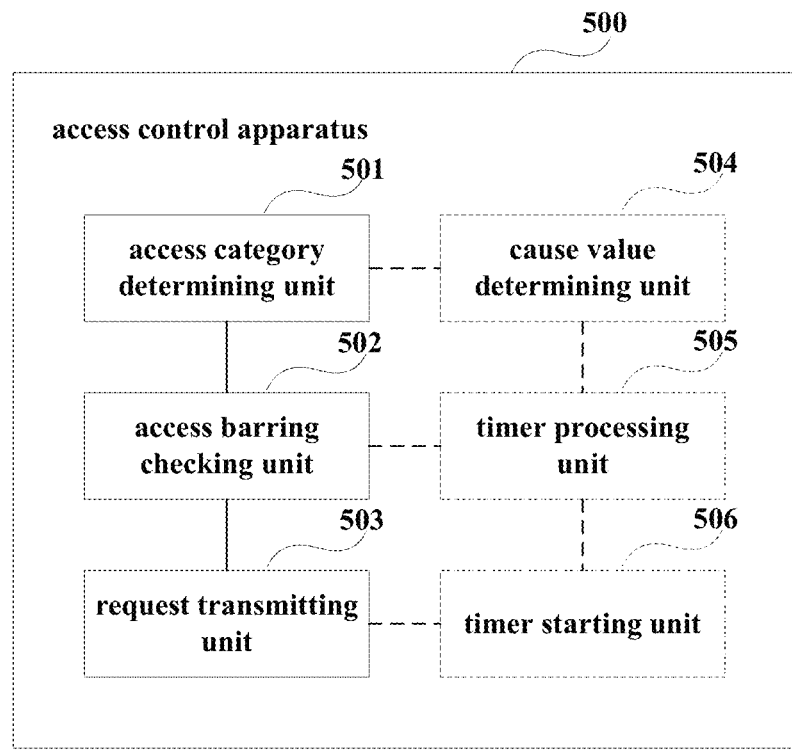
FIG. 5 is a schematic diagram of the access control apparatus of an embodiment of this disclosure.

FIG. 5 is a schematic diagram of the access control apparatus of the embodiment of this disclosure. As shown in FIG. 5, an access control apparatus 500 includes:

an access category determining unit 501 configured to, based on a mapping relationship between access attempt and access category, determine an access category to which an access attempt corresponds;

an access barring checking unit 502 configured to perform access barring check based on the access category, to determine whether an access attempt to which the access category corresponds is barred; and a request transmitting unit 503 configured to transmit a connection setup request message or a connection recovery request message to a network device when the access attempt is considered as allowed.

As shown in FIG. 5, the access control apparatus 500 may further include:

a cause value determining unit 504 configured to, based on a mapping relationship between access attempt and setup cause value or a mapping relationship between access category and setup cause value, determine a setup cause value to which the access attempt corresponds.

In an embodiment, the request transmitting unit 503 may, based on an indication of the network device or a condition configured by the network device, contain the access category in the connection setup request message or the connection recovery request message, or contain the setup cause value in the connection setup request message or the connection recovery request message.

For example, the network side may configure a parameter useAccessCate, and when the parameter is set to be True, the access category may be contained in the connection setup request message or connection recovery request message; and in a case where the parameter is not set to be True, for example, the parameter is set to be false, the setup cause value may be included in the connection setup request message or the connection recovery request message.

Alternatively, the network side may configure a threshold TH, and when the number of required resources (such as the number of bits) indicating the access category is greater than the threshold, the setup cause value may be included in the connection setup request message or connection recovery request message; and when the number of the required resources (such as the number of bits) indicating the access category is less than or equal to the threshold, the access category may be included in the connection setup request message or the connection recovery request message.

In one embodiment, the access category and/or a setup cause value are/is determined in an NAS; one or more of the mapping relationship between access attempt and access category, the mapping relationship between access attempt and setup cause value and the mapping relationship between access category and setup cause value is/are defined in the NAS, or notified by the network device to a UE via signaling of the NAS. And the NAS indicates or delivers the determined access category and/or the setup cause value to a radio resource control (RRC) layer, and the radio resource control layer performs the access barring check.

In another embodiment, the access category and/or the setup cause value may be determined in a radio resource control layer; one or more of the mapping relationship between access attempt and access category, the mapping relationship between access attempt and setup cause value and the mapping relationship between access category and setup cause value may be defined in the radio resource control layer, or notified by the network device to a UE via signaling of the radio resource control layer. And an NAS provides the radio resource control layer with one or more parameters for determining the access category, and the radio resource control layer performs the access barring check.

In a further embodiment, the access category and/or the setup cause value may be determined in multiple different layers; one or more of the mapping relationship between access attempt and access category, the mapping relationship between access attempt and setup cause value and the mapping relationship between access category and setup cause value may be defined in the layers initiating the access attempt or a layer specific for a radio resource control state.

For example, the access category is determined in the layers initiating the access attempt or the layer specific for a radio resource control state, and/or the setup cause value is determined in the layers initiating the access attempt or the layer specific for a radio resource control state.

The layer initializing the access attempt may include one or more of the following layers and/or one or more entities: an application layer, an IP layer, an NAS, an RRC layer, or a user plane; and the layer specific for a radio resource control state may include one or more of the following layers and/or one or more entities: an NAS when a UE is in an idle state, an RRC layer when the UE is in a deactivated state, and a user plane when the UE is in a connected state.

In an embodiment, when multiple different access categories are determined in the multiple different layers, the NAS or the radio resource control layer may select an access category from the multiple different access categories.

As shown in FIG. 5, the access control apparatus 500 may further include:

a timer processing unit 505 configured to process one or more timers used for access control; each timer corresponds to an access category or an access category group or all access categories; and a timer starting unit 506 configured to start the one or more timers.

For example, the timers may include a UE-specific barring timer, and the timer starting unit 506 starts the UE-specific barring timer when the access category is applicable to the UE-specific barring timer and a result of the performing access barring check based on the access category is that the access to which the access category corresponds is barred; and the access barring checking unit 502 may further be configured to not perform access barring check on all access categories or specified or configured access categories of the UE when the UE-specific barring timer is running, and determine that the access attempt or the access to which the access category corresponds is barred.

For another example, the timers may include a UE-specific grant timer, and the timer starting unit 506 starts the UE-specific grant timer when the access category is applicable to the UE-specific grant timer and a result of the performing access barring check based on the access category is that the access to which the access category corresponds is allowed; and the access barring checking unit 502 may further be configured to not perform access barring check on all access categories or specified or configured access categories of the UE when the UE-specific grant timer is running, and determine that the access attempt or the access to which the access category corresponds is allowed.

For a further example, the timers include an access-category-specific barring timer or an access-category-group-specific barring timer, and the timer starting unit 506 starts the access-category-specific barring timer or the access-category-group-specific barring timer when the access category is applicable to the access-category-specific barring timer or the access-category-group-specific barring timer and a result of the performing access barring check based on the access category is that the access to which the access category corresponds is barred; and the access barring checking unit 502 may further be configured to not perform access barring check on the access category or the access category group when the access-category-specific barring timer or access-category-group-specific barring timer is running, and determine that the access attempt or the access to which the access category or the access category group corresponds is barred.

For yet another example, the timers include an access-category-specific grant timer or an access-category-group-specific grant timer, and the timer starting unit 506 starts the access-category-specific grant timer or the access-category-group-specific grant timer when the access category is applicable to the access-category-specific grant timer or the access-category-group-specific grant timer and a result of the performing access barring check based on the access category is that the access to which the access category corresponds is allowed; and the access barring checking unit 502 may further be configured to not perform access barring check on the access category or the access category group when the access-category-specific grant timer or access-category-group-specific grant timer is running, and determine that the access attempt or the access to which the access category or the access category group corresponds is allowed.

It should be noted that the components or modules related to this disclosure are only described above. However, this disclosure is not limited thereto, and the access control apparatus 500 may further include other components or modules, and reference may be made to related techniques for particulars of these components or modules.

Furthermore, for the sake of simplicity, connection relationships between the components or modules or signal profiles thereof are only illustrated in FIG. 5. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that in different scenarios (such as different RRC states, including an idle state, a non-activated state and a connected state), when the UE performs an access attempt, for example, an access category to which the access attempt corresponds may be uniquely determined; and in a case where an access category is unable to be uniquely determined, multiple access categories are processed, thereby performing access barring check based on the access category, and achieving a unified access control mechanism.

Embodiment 4

The embodiments of this disclosure provide an access control apparatus. The apparatus may be a network device, and may also be one or more components or assemblies configured in a network device. And contents in the embodiments identical to those in Embodiment 2 shall not be described herein any further.

Figure 6:
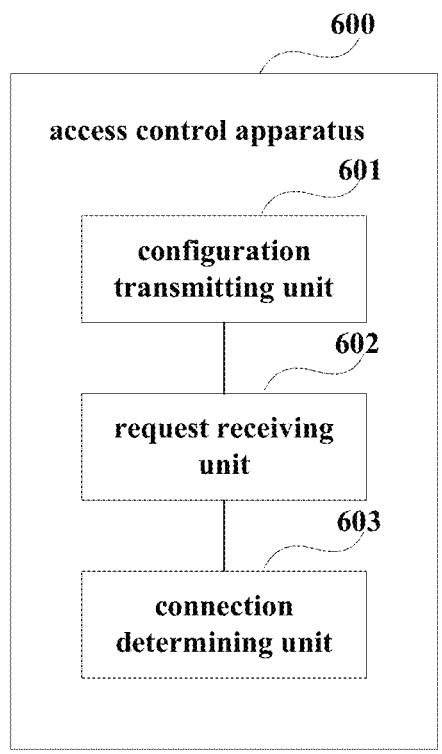
FIG. 6 is another schematic diagram of the access control apparatus of the embodiment of this disclosure.

FIG. 6 is a schematic diagram of the access control apparatus of the embodiment of this disclosure. As shown in FIG. 6, an access control apparatus 600 includes:

a configuration transmitting unit 601 configured to transmit configuration information used for configuring a mapping relationship between access attempt and access category to a UE, so that the UE determines an access category to which an access attempt corresponds based on the mapping relationship between access attempt and access category;

a request receiving unit 602 configured to receive a connection setup request message or a connection recovery request message transmitted by the UE; and a connection determining unit 603 configured to determine whether the connection setup request message or the connection recovery request message of the UE is allowed.

In an embodiment, the configuration transmitting unit 601 may further be configured to: transmit configuration information used for configuring a mapping relationship between access attempt and setup cause value or a mapping relationship between access category and setup cause value to the UE, so that the UE determines a setup cause value to which an access attempt corresponds based on the mapping relationship between access attempt and setup cause value or the mapping relationship between access category and setup cause value.

In an embodiment, the configuration transmitting unit 601 may further be configured to: transmit configuration information used for configuring one or more timers used for access control to the UE; and each timer corresponds to an access category or an access category group or all access categories.

It should be noted that the components or modules related to this disclosure are only described above. However, this disclosure is not limited thereto, and the access control apparatus 600 may further include other components or modules, and reference may be made to related techniques for particulars of these components or modules.

Furthermore, for the sake of simplicity, connection relationships between the components or modules or signal profiles thereof are only illustrated in FIG. 6. However, it should be understood by those skilled in the art that such related techniques as bus connection, may be adopted. And the above components or modules may be implemented by hardware, such as a processor, a memory, a transmitter, and a receiver, which are not limited in the embodiment of this disclosure.

It can be seen from the above embodiments that in different scenarios (such as different RRC states, including an idle state, a non-activated state and a connected state), when the UE performs an access attempt, for example, an access category to which the access attempt corresponds may be uniquely determined; and in a case where an access category is unable to be uniquely determined, multiple access categories are processed, thereby performing access barring check based on the access category, and achieving a unified access control mechanism.

Embodiment 5

The embodiments of this disclosure provide a communication system, and reference may be made to FIG. 1, with contents identical to those in embodiments 1-4 being not going to be described herein any further. In this embodiment, the communication system 100 may include:

a network device 101 configured with the access control apparatus 600 as described in Embodiment 4; and a user equipment 102 configured with the access control apparatus 500 as described in Embodiment 3.

The embodiment of this disclosure further provides a network device, which may be, for example, a base station. However, this disclosure is not limited thereto, and it may also be another network device.

Figure 7:
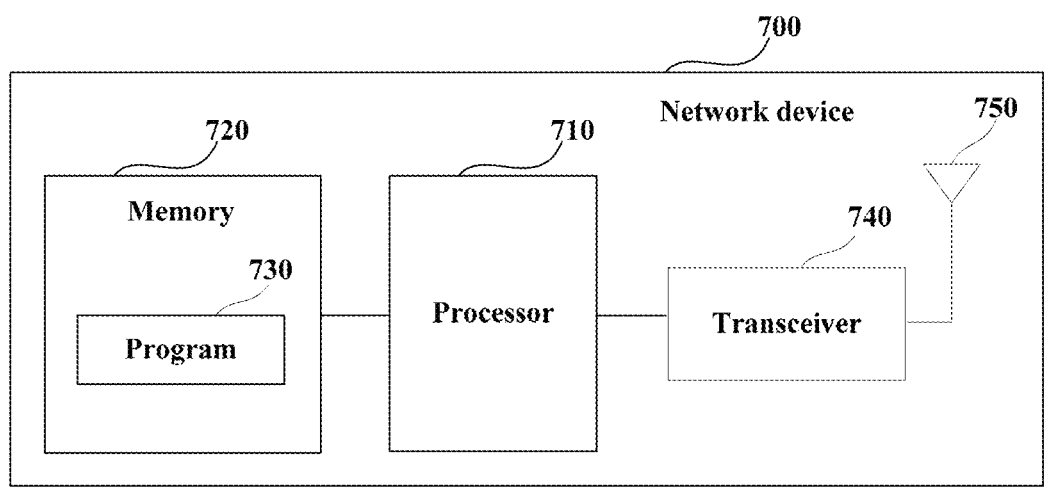
FIG. 7 is a schematic diagram of the network device of an embodiment of this disclosure.

FIG. 7 is a schematic diagram of a structure of the network device of the embodiment of this disclosure. As shown in FIG. 7, a network device 700 may include a processor 710 (such as a central processing unit (CPU)) and a memory 720, the memory 720 being coupled to the processor 710. The memory 720 may store various data, and furthermore, it may store a program 730 for data processing, and execute the program 730 under control of the processor 710.

For example, the processor 710 may be configured to execute the program 730 to carry out the access control method described in Embodiment 2. For example, the processor 710 may be configured to execute the following control: transmitting configuration information used for configuring a mapping relationship between access attempt and access category to a UE, so that the UE determines an access category to which an access attempt corresponds based on the mapping relationship between access attempt and access category; receiving a connection setup request message or a connection recovery request message transmitted by the UE; and determining whether the connection setup request message or the connection recovery request message of the UE is allowed.

In one embodiment, the processor 710 may further be configured to execute the following control: transmitting configuration information used for configuring a mapping relationship between access attempt and setup cause value or a mapping relationship between access category and setup cause value to the UE, so that the UE determines a setup cause value to which an access attempt corresponds based on the mapping relationship between access attempt and setup cause value or the mapping relationship between access category and setup cause value.

In one embodiment, the processor 710 may further be configured to execute the following control: transmitting configuration information used for configuring one or more timers used for access control to the UE; each timer corresponds to an access category or an access category group or all access categories.

Furthermore, as shown in FIG. 7, the network device 700 may include a transceiver 740, and an antenna 750, etc. Functions of the above components are similar to those in the relevant art, and shall not be described herein any further. It should be noted that the network device 700 does not necessarily include all the parts shown in FIG. 7, and furthermore, the network device 700 may include parts not shown in FIG. 7, and the relevant art may be referred to.

The embodiment of this disclosure further provides a user equipment, however, this disclosure is not limited thereto, and it may also be another equipment.

Figure 8:
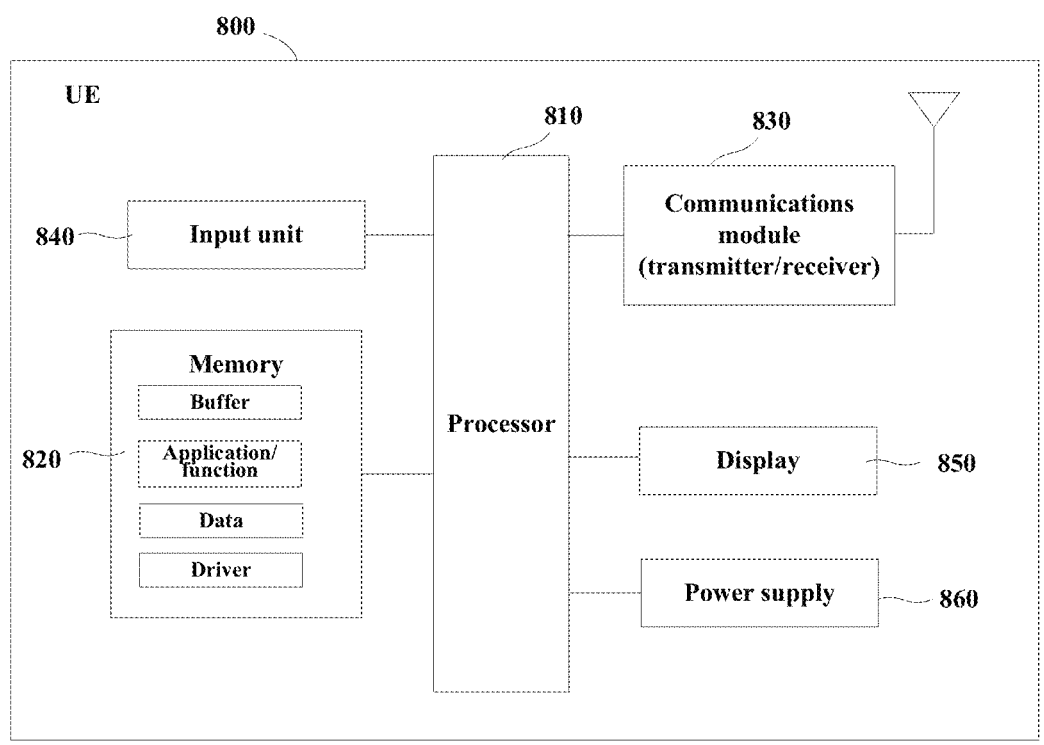
FIG. 8 is a schematic diagram of the user equipment of an embodiment of this disclosure.

FIG. 8 is a schematic diagram of the user equipment of the embodiment of this disclosure. As shown in FIG. 8, a user equipment 800 may include a processor 810 and a memory 820, the memory 820 storing data and a program and being coupled to the processor 810. It should be noted that his figure is illustrative only, and other types of structures may also be used, so as to supplement or replace this structure and achieve a telecommunications function or other functions.

For example, the processor 810 may be configured to execute a program to carry out the access control method described in Embodiment 1. For example, the processor 810 may be configured to execute the following control: based on a mapping relationship between access attempt and access category, determining an access category to which an access attempt corresponds; performing access barring check based on the access category, to determine whether an access attempt to which the access category corresponds is barred; and transmitting a connection setup request message or a connection recovery request message to a network device when the access attempt is considered as allowed.

In one embodiment, the processor 810 may further be configured to execute the following control: determining a setup cause value to which an access attempt corresponds based on the mapping relationship between access attempt and setup cause value or the mapping relationship between access category and setup cause value.

In one embodiment, the processor 810 may further be configured to execute the following control: based on an indication of the network device or a condition configured by the network device, containing the access category in the connection setup request message or the connection recovery request message, or containing the setup cause value in the connection setup request message or the connection recovery request message.

In one embodiment, the access category and/or a setup cause value are/is determined in a non-access stratum (NAS); one or more of the mapping relationship between access attempt and access category, the mapping relationship between access attempt and setup cause value and the mapping relationship between access category and setup cause value is/are defined in the NAS, or notified by the network device to a user equipment via signaling of the NAS. The NAS indicates or delivers the determined access category and/or the setup cause value to a radio resource control (RRC) layer, and the radio resource control layer performs the access barring check.

In one embodiment, the access category and/or the setup cause value are/is determined in a radio resource control layer; one or more of the mapping relationship between access attempt and access category, the mapping relationship between access attempt and setup cause value and the mapping relationship between access category and setup cause value is/are defined in the radio resource control layer, or notified by the network device to a user equipment via signaling of the radio resource control layer. The NAS provides the radio resource control layer with one or more parameters for determining the access category, and the radio resource control layer performs the access barring check.

In one embodiment, the access category and/or the setup cause value are/is determined in multiple different layers; one or more of the mapping relationship between access attempt and access category, the mapping relationship between access attempt and setup cause value and the mapping relationship between access category and setup cause value is/are defined in the layers initiating the access attempt or a layer specific for a radio resource control state.

For example, the access category is determined in the layers initiating the access attempt or a layer specific for a radio resource control state, and/or the setup cause value is determined in the layers initiating the access attempt or a layer specific for a radio resource control state. The layer initializing the access attempt includes one or more of the following layers and/or entities: an application layer, an IP layer, an NAS, an RRC layer, or a user plane; and the layer determined according to a radio resource control state includes one or more of the following layers and/or entities: an NAS when a user equipment is in an idle state, an RRC layer when the UE is in a deactivated state, and a user plane when the UE is in a connected state.

In one embodiment, when the multiple different access categories are determined in the multiple different layers, the NAS or the radio resource control layer selects an access category from the multiple different access categories.

In one embodiment, the processor 810 may further be configured to execute the following control: processing one or more timers used for access control; each timer corresponds to an access category or an access category group.

For example, the timers include a UE-specific barring timer, and the processor 810 may further be configured to execute the following control: starting the UE-specific barring timer when the access category is applicable to the UE-specific barring timer and a result of the performing access barring check based on the access category is that the access to which the access category corresponds is barred; and performing no access barring check on all access categories or specified or configured access categories of the UE when the UE-specific barring timer is running, and determining that the access attempt or the access to which the access category corresponds is barred.

For example, the timers include a UE-specific grant timer, and the processor 810 may further be configured to execute the following control: starting the UE-specific grant timer when the access category is applicable to the UE-specific grant timer and a result of the performing access barring check based on the access category is that the access to which the access category corresponds is allowed; and performing no access barring check on all access categories or specified or configured access categories of the UE when the UE-specific grant timer is running, and determining that the access attempt or the access to which the access category corresponds is allowed.

For example, the timers include an access-category-specific barring timer or an access-category-group-specific barring timer, and the processor 810 may further be configured to execute the following control: starting the access-category-specific barring timer or the access-category-group-specific barring timer when the access category is applicable to the access-category-specific barring timer or the access-category-group-specific barring timer and a result of the performing access barring check based on the access category is that the access to which the access category corresponds is barred; and performing no access barring check on the access category or the access category group when the access-category-specific barring timer or access-category-group-specific barring timer is running, and determining that the access attempt or the access to which the access category or the access category group corresponds is barred.

For example, the timers include an access-category-specific grant timer or an access-category-group-specific grant timer, and the processor 810 may further be configured to execute the following control: starting the access-category-specific grant timer or the access-category-group-specific grant timer when the access category is applicable to the access-category-specific grant timer or the access-category-group-specific grant timer and a result of the performing access barring check based on the access category is that the access to which the access category corresponds is allowed; and performing no access barring check on the access category or the access category group when the access-category-specific grant timer or access-category-group-specific grant timer is running, and determining that the access attempt or the access to which the access category or the access category group corresponds is allowed.

As shown in FIG. 8, the user equipment 800 may further include a communication module 830, an input unit 840, a display 850, and a power supply 860; functions of the above components are similar to those in the relevant art, which shall not be described herein any further. It should be noted that the user equipment 800 does not necessarily include all the parts shown in FIG. 8, and the above components are not necessary. Furthermore, the user equipment 800 may include parts not shown in FIG. 8, and the relevant art may be referred to.

An embodiment of the present disclosure provides a computer readable program code, which, when executed in a network device, will cause the network device to carry out the access control method described in Embodiment 2.

An embodiment of this disclosure provides a computer storage medium, including a computer readable program code, which will cause a network device to carry out the access control method described in Embodiment 2.

An embodiment of the present disclosure provides a computer readable program code, which, when executed in a user equipment, will cause the user equipment to carry out the access control method as described in Embodiment 1.

An embodiment of the present disclosure provides a computer storage medium, including a computer readable program code, which will cause a user equipment to carry out the access control method as described in Embodiment 1.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 6 (such as the receiving unit and the processing unit) may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 8-10 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. An access control apparatus, comprising:
a memory that stores a plurality of instructions; and
a processor coupled to the memory and configured to execute the instructions to:

based on a mapping relationship between an access attempt and an access category, determine an access category to which an access attempt corresponds;

perform an access barring check based on the access category, to determine whether an access attempt to which the access category corresponds is barred; and transmit a connection setup request message or a connection recovery request message to a network device when the access attempt is considered as allowed, wherein the processor is further configured to process one or more timers used for access control, a timer corresponds to an access category or an access category group or all access categories, the timer comprises an access-category-specific barring timer or an access-category-group-specific barring timer, the processor is further configured to start the access-category-specific barring timer or the access-category-group-specific barring timer when the access category defines or configures the access-category-specific barring timer or the access-category-group-specific barring timer and a result of the performing the access barring check based on the access category is that an access to which the access category corresponds is barred, and the processor is further configured to determine that the access attempt or the access to which the access category or the access category group corresponds is barred when the access-category-specific barring timer or access-category-group-specific barring timer is running.

2. The access control apparatus according to claim 1, wherein the timers are configured by a radio resource control layer or a non-access stratum (NAS) layer, and/or, the timers are maintained by the radio resource control layer or the NAS layer.

3. The access control apparatus according to claim 1, wherein the timers comprise a UE-specific barring timer, and the processor is further configured to start the UE-specific barring timer when the access category defines or configures the UE-specific barring timer and a result of the performing the access barring check based on the access category is that an access to which the access category corresponds is barred; and the processor is further configured to determine that the access attempt or the access to which the access category corresponds is barred when the UE-specific barring timer is running.

4. The access control apparatus according to claim 1, wherein the timers comprise a UE-specific grant timer, and the processor is further configured to start the UE-specific grant timer when the access category defines or configures the UE-specific grant timer and a result of the performing the access barring check based on the access category is that an access to which the access category corresponds is allowed; and the processor is further configured to determine that the access attempt or the access to which the access category corresponds is allowed when the UE-specific grant timer is running.

5. The access control apparatus according to claim 1, wherein the timers comprise an access-category-specific grant timer or an access-category-group-specific grant timer, and the processor is further configured to start the access-category-specific grant timer or the access-category-group-specific grant timer when the access category defines or configures the access-category-specific grant timer or the access-category-group-specific grant timer and a result of the performing the access barring check based on the access category is that an access to which the access category corresponds is allowed; and the processor is further configured to determine that the access attempt or the access to which the access category or the access category group corresponds is allowed when the access-category-specific grant timer or access-category-group-specific grant timer is running.

6. The access control apparatus according to claim 1, wherein the processor is further configured to, based on a mapping relationship between access attempt and setup cause value or a mapping relationship between access category and setup cause value, determine a setup cause value to which the access attempt corresponds.

7. The access control apparatus according to claim 1, wherein the processor is further configured to, based on an indication of the network device or a condition configured by the network device, contain the access category in the connection setup request message or the connection recovery request message, or contain the setup cause value in the connection setup request message or the connection recovery request message.

8. The access control apparatus according to claim 1, wherein the access category and/or a setup cause value are/is determined in a non-access stratum (NAS); and wherein one or more of the mapping relationship between access attempt and access category, the mapping relationship between access attempt and setup cause value and the mapping relationship between access category and setup cause value is/are defined in the NAS, or notified by the network device to a user equipment (UE) via signaling of the NAS.

9. The access control apparatus according to claim 8, wherein the NAS indicates or delivers the determined access category and/or the setup cause value to a radio resource control (RRC) layer, and the radio resource control layer performs the access barring check.

10. The access control apparatus according to claim 1, wherein the access category and/or the setup cause value are/is determined in a radio resource control layer;

and wherein one or more of the mapping relationship between access attempt and access category, the mapping relationship between access attempt and setup cause value and the mapping relationship between access category and setup cause value is/are defined in the radio resource control layer, or notified by the network device to a user equipment (UE) via signaling of the radio resource control layer.

11. The access control apparatus according to claim 10, wherein an NAS provides the radio resource control layer with one or more parameters for determining the access category, and the radio resource control layer performs the access barring check.

12. The access control apparatus according to claim 1, wherein the access category and/or the setup cause value are/is determined in at least two layers;

and wherein the layers determining the access category and/or the setup cause value comprise: a layer initializing the access attempt, and/or, a layer determined according to a radio resource control state;

and one or more of the mapping relationship between access attempt and access category, the mapping relationship between access attempt and setup cause value and the mapping relationship between access category and setup cause value is/are defined in the layers determining the access category and/or the setup cause value.

13. The access control apparatus according to claim 12, wherein the layer initializing the access attempt comprises one or more of the following layers and/or entities: an application layer, an IP layer, an NAS, an RRC layer, or a user plane;

and the layer determined according to a radio resource control state comprises one or more of the following layers and/or entities: an NAS when a user equipment (UE) is in an idle state, an RRC layer when the UE is in a deactivated state, and a user plane when the UE is in a connected state.

14. The access control apparatus according to claim 12, wherein when at least two different access categories are determined in the at least two layers, the NAS or the radio resource control layer selects an access category from the at least two different access categories.

15. An access control apparatus, comprising:
a memory that stores a plurality of instructions; and
a processor coupled to the memory and configured to execute the instructions to:
  transmit configuration information used for configuring a mapping relationship between an access attempt and an access category to a user equipment (UE), wherein an access category to which an access attempt corresponds is determined by the UE based on the mapping relationship between an access attempt and an access category;
  receive a connection setup request message or a connection recovery request message transmitted by the UE; and
  determine whether the connection setup request message or the connection recovery request message of the UE is allowed,
wherein the processor is further configured to:
transmit configuration information used for configuring one or more timers used for access control to the UE; and
a timer corresponds to an access category or an access category group or all access categories,
the timer comprises an access-category-specific barring timer or an access-category-group-specific barring timer,
the UE is further configured to start the access-category-specific barring timer or the access-category-group-specific barring timer when the access category defines or configures the access-category-specific barring timer or the access-category-group-specific barring timer and a result of the performing the access barring check based on the access category is that an access to which the access category corresponds is barred, and the UE is further configured to determine that the access attempt or the access to which the access category or the access category group corresponds is barred when the access-category-specific barring timer or access-category-group-specific barring timer is running.

16. The access control apparatus according to claim 15, wherein the processor is further configured to:
transmit configuration information used for configuring the mapping relationship between access attempt and setup cause value or the mapping relationship between access category and setup cause value to the UE, wherein a setup cause value to which an access attempt corresponds is determined by the UE based on the mapping relationship between access attempt and setup cause value or the mapping relationship between access category and setup cause value.

17. A communication system, comprising:
a user equipment (UE), configured to determine an access category to which an access attempt corresponds based on a mapping relationship between an access attempt and an access category; perform an access barring check based on the access category, to determine whether an access attempt to which the access category corresponds is barred; and transmit a connection setup request message or a connection recovery request message to a network device when the access attempt is considered as allowed; and
a network device, configured to transmit configuration information used for configuring the mapping relationship between access attempt and access category to the UE; receive a connection setup request message or a connection recovery request message transmitted by the UE; and determine whether the connection setup request message or the connection recovery request message of the UE is allowed, and
the network device is further configured to transmit configuration information used for configuring one or more timers used for access control to the UE; and
a timer corresponds to an access category or an access category group or all access categories,
the timer comprises an access-category-specific barring timer or an access-category-group-specific barring timer,
the UE is further configured to start the access-category-specific barring timer or the access-category-group-specific barring timer when the access category defines or configures the access-category-specific barring timer or the access-category-group-specific barring timer and a result of the performing the access barring check based on the access category is that an access to which the access category corresponds is barred, and
the UE is further configured to determine that the access attempt or the access to which the access category or the access category group corresponds is barred when the access-category-specific barring timer or access-category-group-specific barring timer is running.

* * * * *